United States Patent [19]
[11] 4,031,467

Singleton, Jr. et al.

[45] June 21, 1977

[54] ALERTING PROCESS AND SYSTEM OF APPARATUS THEREFOR

[76] Inventors: Lewis Singleton, Jr., 422 Ramada, Amarillo, Tex. 79108; James M. Whitney, 3403 Paramount, Amarillo, Tex. 79109

[22] Filed: Sept. 19, 1975

[21] Appl. No.: 614,918

[52] U.S. Cl. .................................. 325/54; 325/466; 343/200

[51] Int. Cl.² .......................................... H04J 3/00

[58] Field of Search .................. 325/51, 53, 54, 55, 325/64, 308, 392, 466, 478, 1, 6, 57; 343/200, 207, 208, 225, 228; 340/224

[56] References Cited

UNITED STATES PATENTS

| | | | |
|---|---|---|---|
| 3,387,212 | 6/1968 | Kaufman | 325/1 |
| 3,521,168 | 7/1970 | Kaiser et al. | 325/53 |
| 3,848,193 | 11/1974 | Martin et al. | 325/64 X |

*Primary Examiner*—Benedict V. Safourek
*Attorney, Agent, or Firm*—Ely Silverman

[57] ABSTRACT

A master control unit is placed for operation at each of several radio stations covering large area zones. A distinct audio triggering frequency is provided for each of several defined smaller zones in the large area zones. On notice from the National Weather Bureau or other appropriate agency, as Sheriff's Office, the operator of the master control unit selectively triggers radio frequency receiver assemblies to automatically connect to disconnected loudspeakers in such radio frequency receiver assemblies in any one small area zone, any combination of such zones, or all zones in its watch area to then automatically cause audible notice of any immediately needed warning affecting only that small area zone or any combination of such smaller area zones.

12 Claims, 17 Drawing Figures

FIG.16
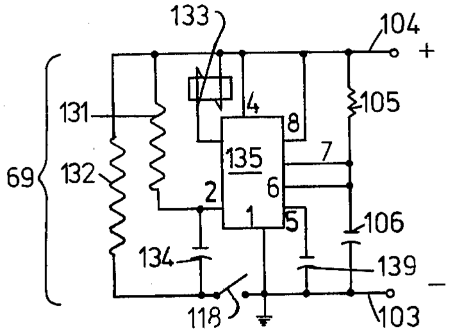
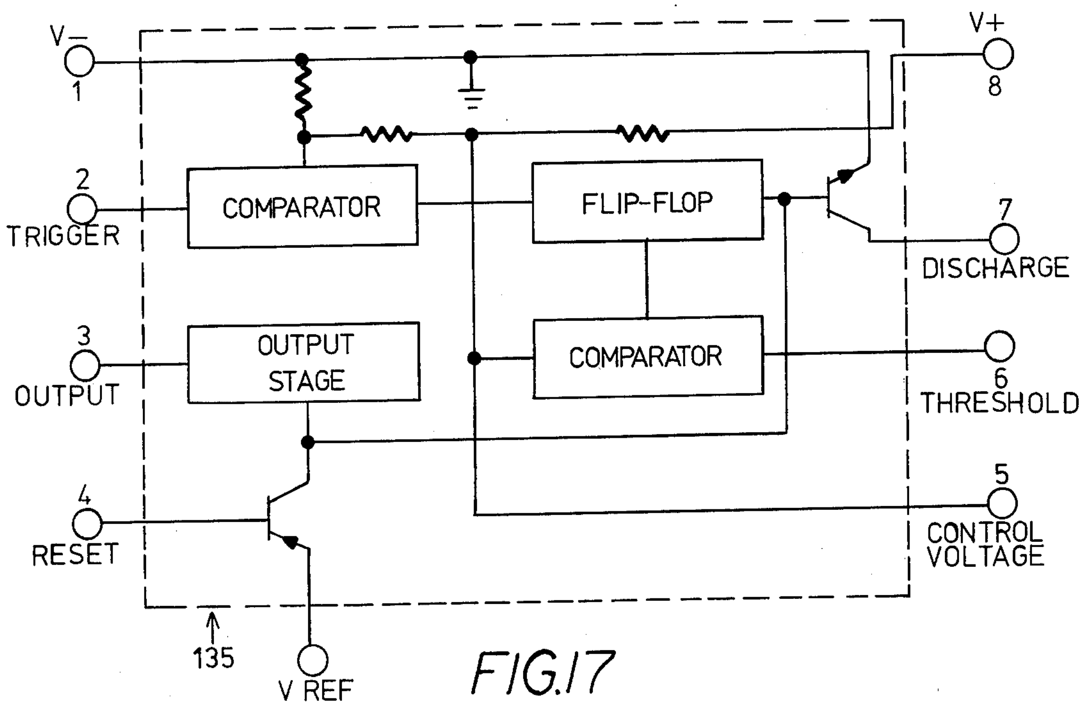
FIG.17

ALERTING PROCESS AND SYSTEM OF APPARATUS THEREFOR

BACKGROUND OF THE INVENTION

1. The Field of the Invention

The field of art to which this invention pertains is modulated carrier were communication systems; plurality of receivers tuned to same frequency; and selective calling.

2. Description of the Prior Art

While several organizations and residents are very interested in developing a tornado warning system the problem remains of being unable to reach people after bedtime and lack of selectivity in providing notice to people in concerned areas while not disturbing parties in areas not requiring notice and limited frequencies practically and properly available for additional service, and expense of additional facilities or services capable of providing notice to area covered by large powered stations (10 to 50 KW transmitter power) by conventional methods.

SUMMARY OF THE INVENTION

Selective audio range triggering frequencies are superimposed on the carrier radiowave frequency of the broadcast stations covering a large area so that a station broadcasting on one radio wave carrier wave broadcast frequency such as a usual commercial broadcast can send trigger signals, each selective for each small geographic area in its effective broadcast zone, and then broadcast an audible message on the same radio frequency through loudspeakers at sites of reception of signal and carrier frequency located at preselected specific small areas for preselected time intervals.

BRIEF DESCRIPTION OF THE DRAWINGS

FIG. 16 is a schematic wiring diagram of the time delay assembly 69; and FIG. 17 is a schematic diagram of the integrated circuit 555 of assembly 69.

DESCRIPTION OF THE PREFERRED EMBODIMENT

Figure 1:
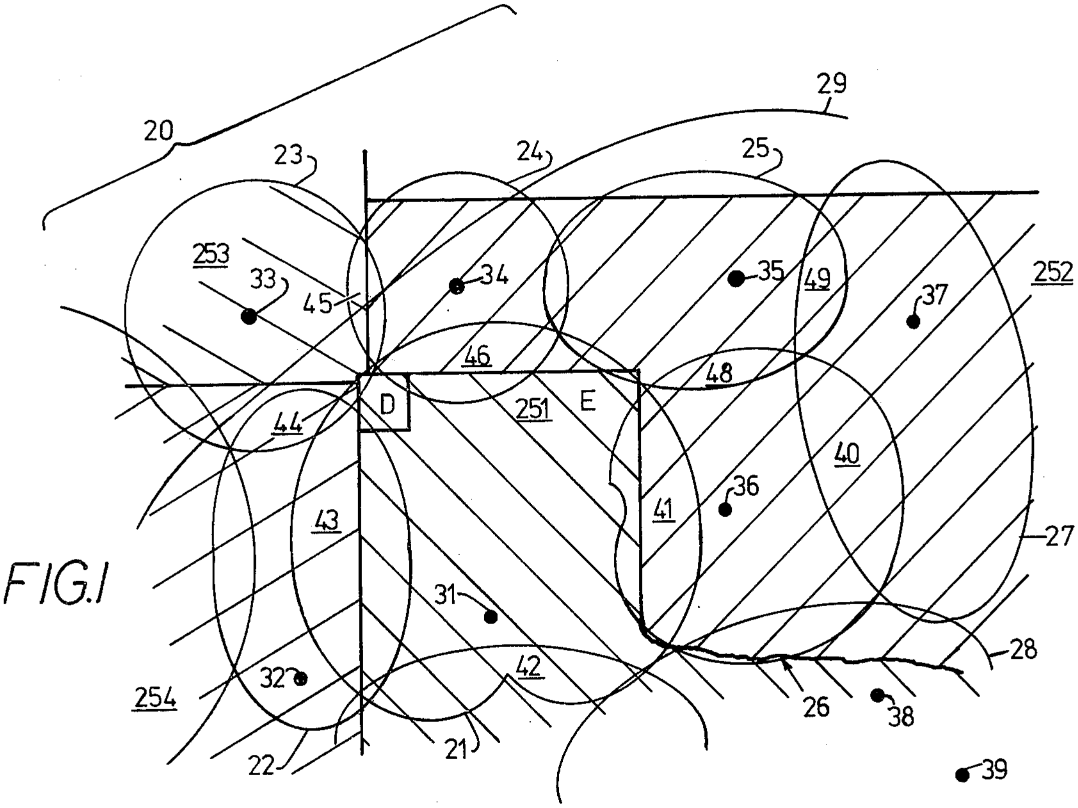
FIG. 1 is a diagrammatic presentation of the overall geographic areas 21–29 over which the systems of this invention are applied.

The overall system 20 of this invention comprises, as shown in FIG. 1 several broadcast areas as 21–28, each one with a principal transmitter therein 31–38. The overall area shown in FIG. 1 is the northwest portion of the State of Texas 251 (shown hatched by slanted lines passing downward to the right) and adjacent portions of the State of Oklahoma (hatched by slanted lines upwardly to the right) 252, and State of Colorado, 253, (hatched by slanted lines passing upward and to the left) and state of New Mexico, 254 (hatched by slanted lines passing downward and to the left).

Each area, as 21, has radio frequency receiver assemblies as 63–65 containing selectively actuated relays and time delays which are readily installed and actuated selectively according to the area in which such receiver is located. The selection of the signal is made at a control board assembly as 50 at the transmitting station. Such a system provides some broadcast overlap zones as 40–49.

FIG. 1 diagrammatically illustrates several different patterns and overlap areas usable in the system of this invention of zones whereat the field intensity is at a useful value, e.g. 0.5 millivolts per meter during day, measured by standard field strength measurement techniques and correspondingly smaller yet effective field strength at night.

Details of the overlap zones of any particular geographic area in the United States are set out in publically available maps, as FCC Conductivity Map M-3.

Figure 2:
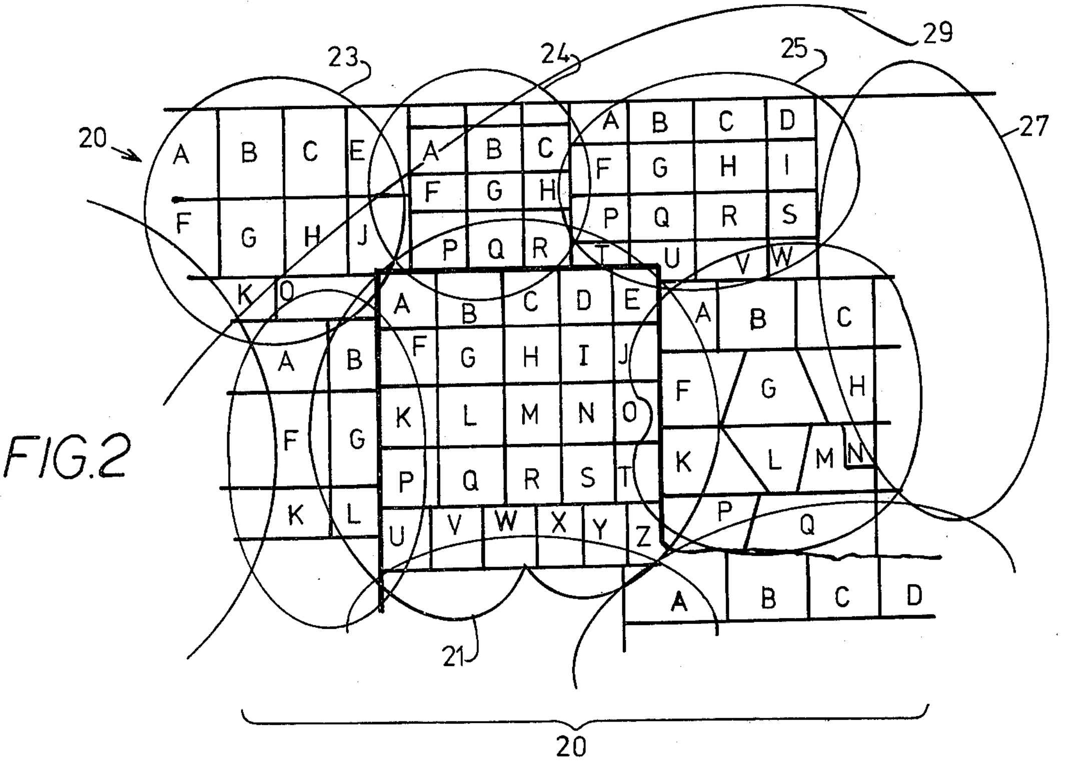
FIG. 2 is a diagrammatic view of the specific zones of each of the areas of FIG. 1.
Figure 3:
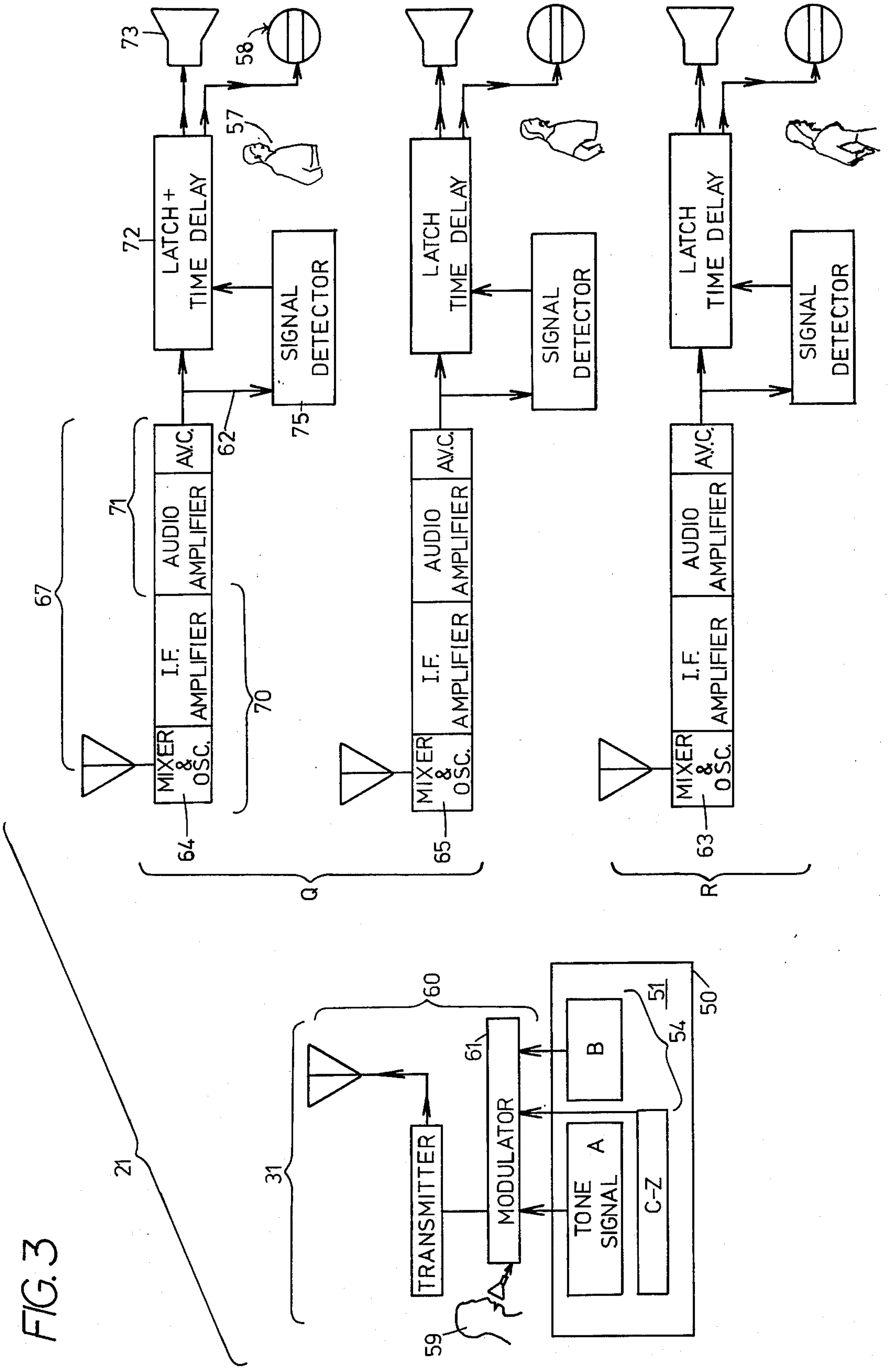
FIG. 3 is a diagrammatic presentation of units in the one area 21 of the several areas 21–29 over which the system of this invention is applied.

The large broadcast zone 21 is divided into several smaller geographically defined areas lettered A–Z in FIG. 2 and corresponding to the counties in that zone, as shown in FIG. 3. Each effective radio frequency broadcast area as 21 has a radio frequency transmitter as 31 therein that covers at least several distinctly defined geographic zones as A–Z. For purposes of efficient and specific location of the sites of receipt of the signals and warnings as hereinbelow described those zones are used to locate receivers of different signal reception characteristics.

Each of the other broadcast areas as 21–27 are also similarly divided into well defined geographically separate key zones, thus zone 22 is divided into key areas A, B, F, G, K, and L; zone 23 is divided into zones, A, B, C, E, F, G, H, J, K, and O; area 24 is divided into areas A–C, F–H, and P–R, while zone 25 is divided into key areas A–D, F–I, and P–S, and T–V.

The total number of key zones in each area, as 21 served by one station as 31, is critical to this invention. In this invention each area, as 21–27 is divided into somewhat less than 30 zones so that the particular circuit used herein may be applicable to all of such variety of sizes of areas without change. Although, if larger number of divisions of an area are desired up to about 45 areas may be served by the circuit shown and, by more complex circuits as two-tone sequential decoders, 90 separate areas may be readily distinctly served by two-tone sequential encoder signal circuits in place of the single tone circuits disclosed herein.

The localized area broadcasting system 20 comprises in each of the several large areas, as areas 21–29, as shown in FIG. 3 for area 21, radio frequency wave and signal transmitter assemblies 31–39 and several receivers as 63–65, in each area as 21.

Figure 4:
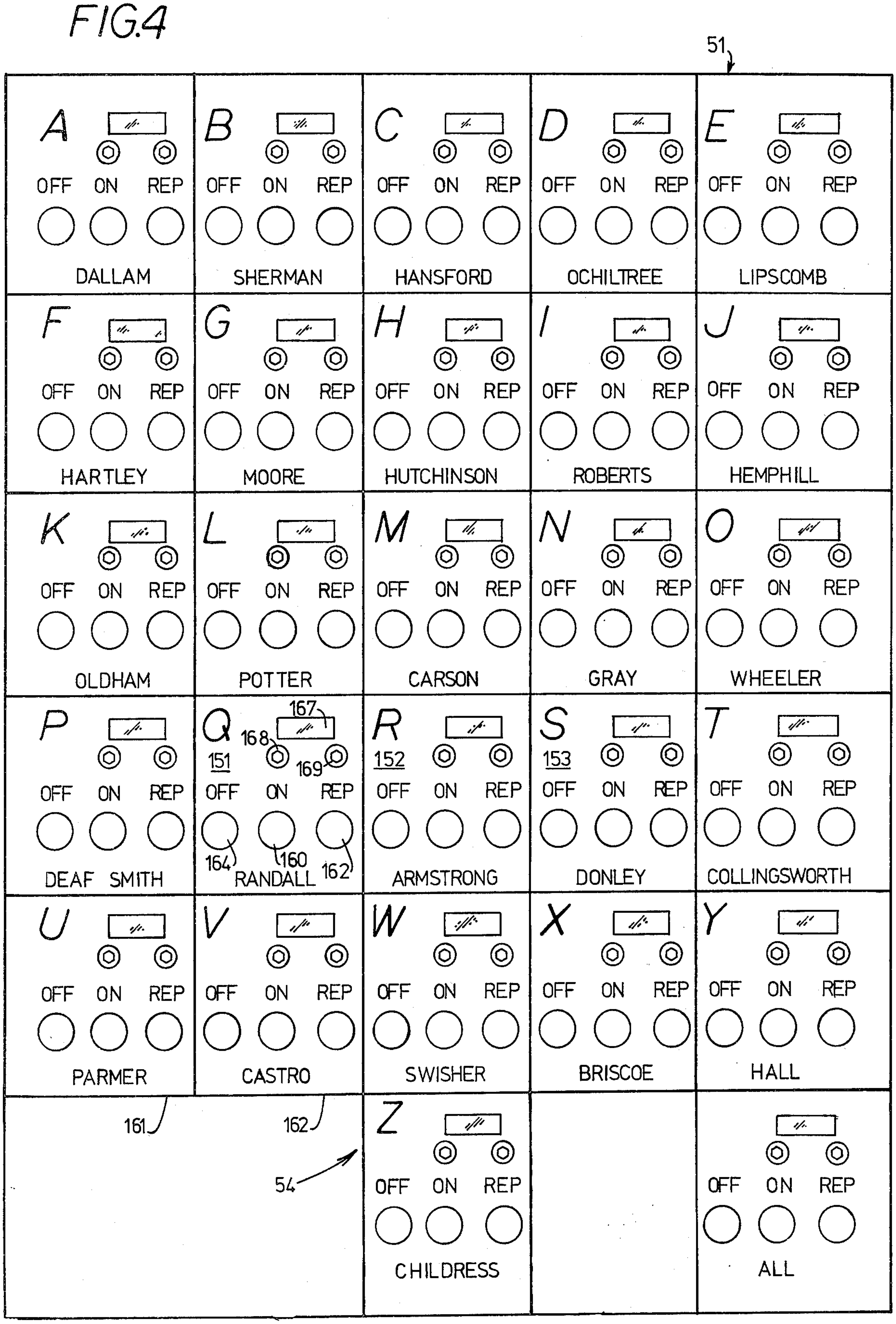
FIG. 4 is a diagrammatic view of the control panel FIG. 3.

Each radio wave and signal transmitter assembly; as shown for station 31, comprises a standard radio frequency transmitting circuit and antennae, as 60, with a modulator 61, and a panel board assembly 50 connected to the modulator. The panel board assembly includes (a) a switch control panel 51 on which are located (b) an array as 54 of switch groups as 151–153 labeled as A–Z as shown in FIG. 4, each including a selective signal generating circuit unit connected to each of the switch groups (as at groups Q, R and S, respectively), on panel assembly 50.

Each of the signal generating circuit units, as 151, is used for triggering all the signal receiving circuits of receivers as 64 and 65 in only one area, as Q of the larger zone 21 reached by radio waves from transmitter 31. Each circuit as 151, 152 and 153 is a circuit for generating a signal tone at a specific audio frequency in range of 20 to 3,000 cycles per second for a predetermined time.

Each switch array 151 comprises (a) an "on" switch 160 that provide for turning on the time delay relay circuit 161; circuit 161 automatically connects a rectified a.c. power source to circuit 154 for an adequately long time, e.g. 30 seconds, to avoid accidental or spurious signals like the audio signals of circuit 154; (b) a relay switch 163 and a actuating button 162 therefor to keep audio signal circuit 154 actuated for as many intervals on circuit 161 as desired for longer messages; (c) an off button 165 and a relay 165 therefor; and (d) a tone generating circuit 154.

Pilot light 168 indicates that circuit 161 is operating. Pilot light 169 indicates that repeat circuit 163 is operating. Clock 167 shows how long the circuit 154 of that switch array had been operative in any one cycle of operation. Data on the circuit 154 are set out in Table I. The latching signal button switch 162 is operatively connected to and actuates a latching relay 163 that repeatedly activates circuit 154 at intervals that are sufficiently long to provide time for the desired message and repetitions thereof until the buttons 162 and 160 are released by pressing the "off" button switch 164. Button switch 164 activates a cut off relay 165 that sends a cut off signal to circuits 161 and 163. Circuit 154 on switch group 151 is directed to activate all receivers as 64 in only the corresponding one specific defined geographic area as Q on grid of FIG. 2. Such selective activation is effected by setting of circuit characteristics therefor, i.e., for example, to tune the signal broadcast circuit 154 of FIG. 5 to produce a tone frequency of 100 Hz, the capacitators 191 and 192 are 0.10 microfarad capacity and resistors 190 and 193 would be 15.9 kilohms according to the formula $F = 0.159/RxC$; where F is frequency in hertz and R is resistance in meg ohms of resistances 190 and 193 and C is capacitance in microfarads of capacitators 191 and 192.

Figure 5:
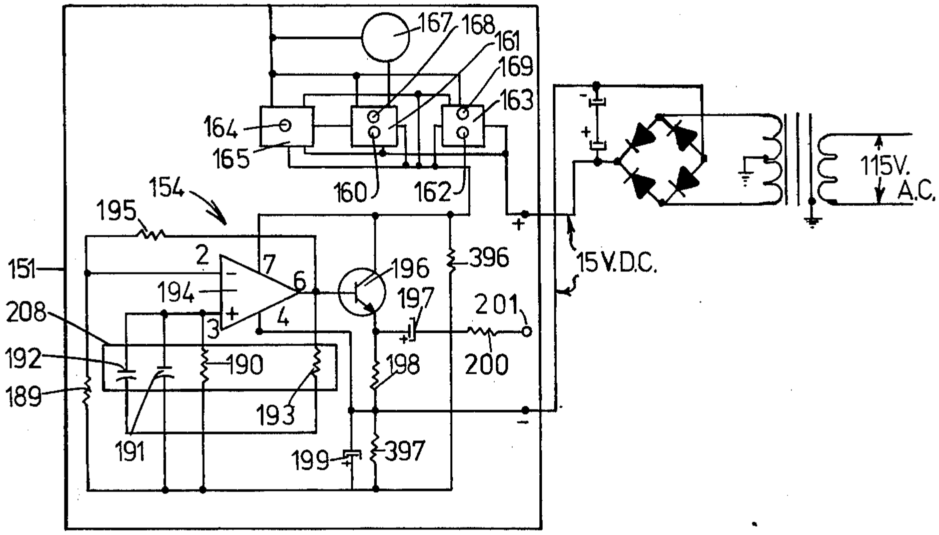
FIG. 5 is a diagrammatic view of the electrical components in one of the switch arrays, 151, of the control panel assembly 51.

The circuit elements 190–193 are preferably mounted on a separate rigid insulating plate 208 connected by electrical connectors to the remaining circuit elements as shown in FIG. 5. The substitution of a similar plate with differing values of resistors and capacitators provides different audio frequency outputs.

Figure 6:
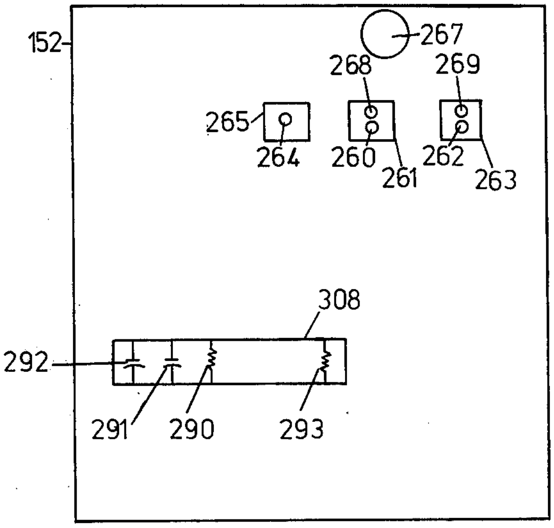
FIG. 6 is a diagrammatic view of another of the switch arrays, 152, of the control panel assembly 51.
Figure 7:
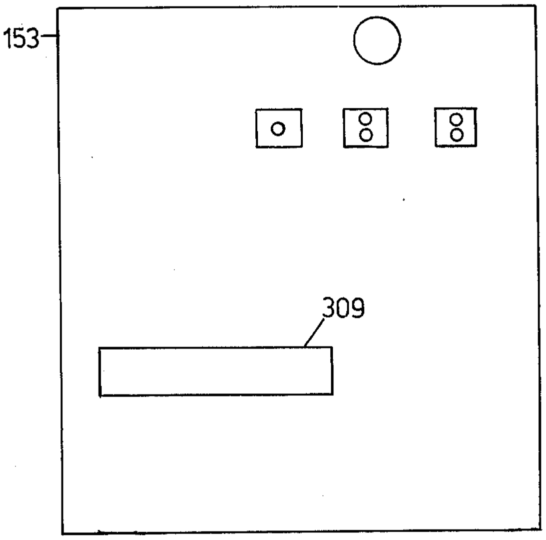
FIG. 7 is a diagrammatic view of another of the switch arrays, 153, of the control panel assembly 51.

Unit 152, connected to switch group R, has a circuit as 154 but with different values of the frequency determining components as 190, 191, 192 and 193 (shown as 290, 291, 292 and 293, respectively in FIG. 6). By use of such different audio frequencies, the signaling circuit as 154 in other switch units as 152 of panel assembly 50 will activate signal receiving assemblies as 63 in other zones as zone R; e.g., for different frequency as 10 c.p.s (Hz) at circuit corresponding to 154 of group 151 in switch group 152 and supported on panel 308 one microfarad condenser is used, according to the formula $F = 0.159/RxC$ as above. The module 308 of unit 152 is connected like module 208 to a circuit as 154, but the values of resistance and capacitance are different to provide for generation of adequately distinct, from point of view of difference in frequency, from that generated by unit 151 and its bandwidth to produce an audio signal that selectively activates only the receivers of zone R of area 21.

Switch group 153 has on, off, and repeat switches like unit 151 and has a circuit like 154 but with different values of the frequency determining components as 190, 191, 192 and 193 in circuit 151.

Such different frequency determining components are provided by use of a rigid module 309 connected like modules 308 and 208 to the same circuit as 154 but having different values of resistors and capacitators as 190–193 of unit 154.

All other switch groups for areas A–Z have corresponding circuits, switches, lights and clocks similarly operatively connected as above described for units 151 but, like 152 and 153, with correspondingly distinguished signal frequencies for each of the different geographical areas A–Z.

Many tones may be generated simultaneously at the panel assembly 50 for broadcast to many different areas of the signal tone for each of such areas, e.g. tones for all of zones P–S and L–N, also, tones for all the zones A–Z may be generated simultaneously at the panel assembly 50 for broadcast to all areas A–Z of the signal tone for each of such areas by actuating the buttons "on" or repeat on the lower right hand corner of the panel labelled "ALL".

A plurality of like radio frequency and signal receiving circuit assemblies as 64 and 65 are located in each single defined area as Q of each larger area as 21 served by one transmitter as 31. In the geographical area R of zone 21, a plurality of like ratio frequency wave and signal frequency receiving assemblies as 63 are located.

Each of the assemblies as 64 in one area as Q of area 21 are identical and each of the assemblies as 63 in another area as R of area 21 are identical. Each of the assemblies as 64 comprises a modified receiver 67 and an audio signal detector 75 assembly and a latch and time delay assembly 72. The modified receiver 67 comprises a radio frequency receiver assembly 70 and an intermediate frequency amplifier and audio signal detector assembly 71 and an audio amplifier and speaker assembly 73.

Figure 8:
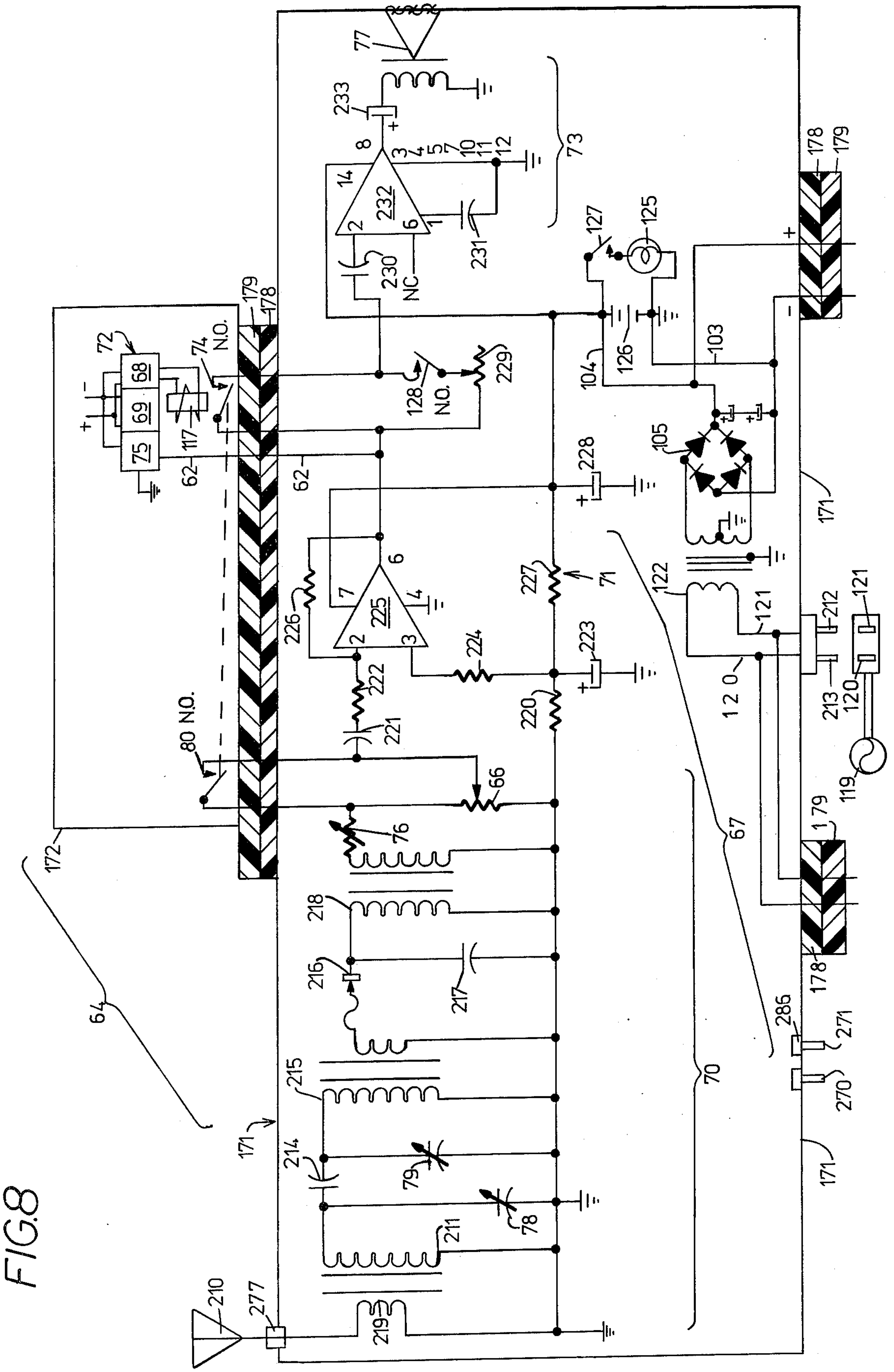
FIG. 8 is a schematic wiring diagram of a receiving assembly 64.
Figure 9:
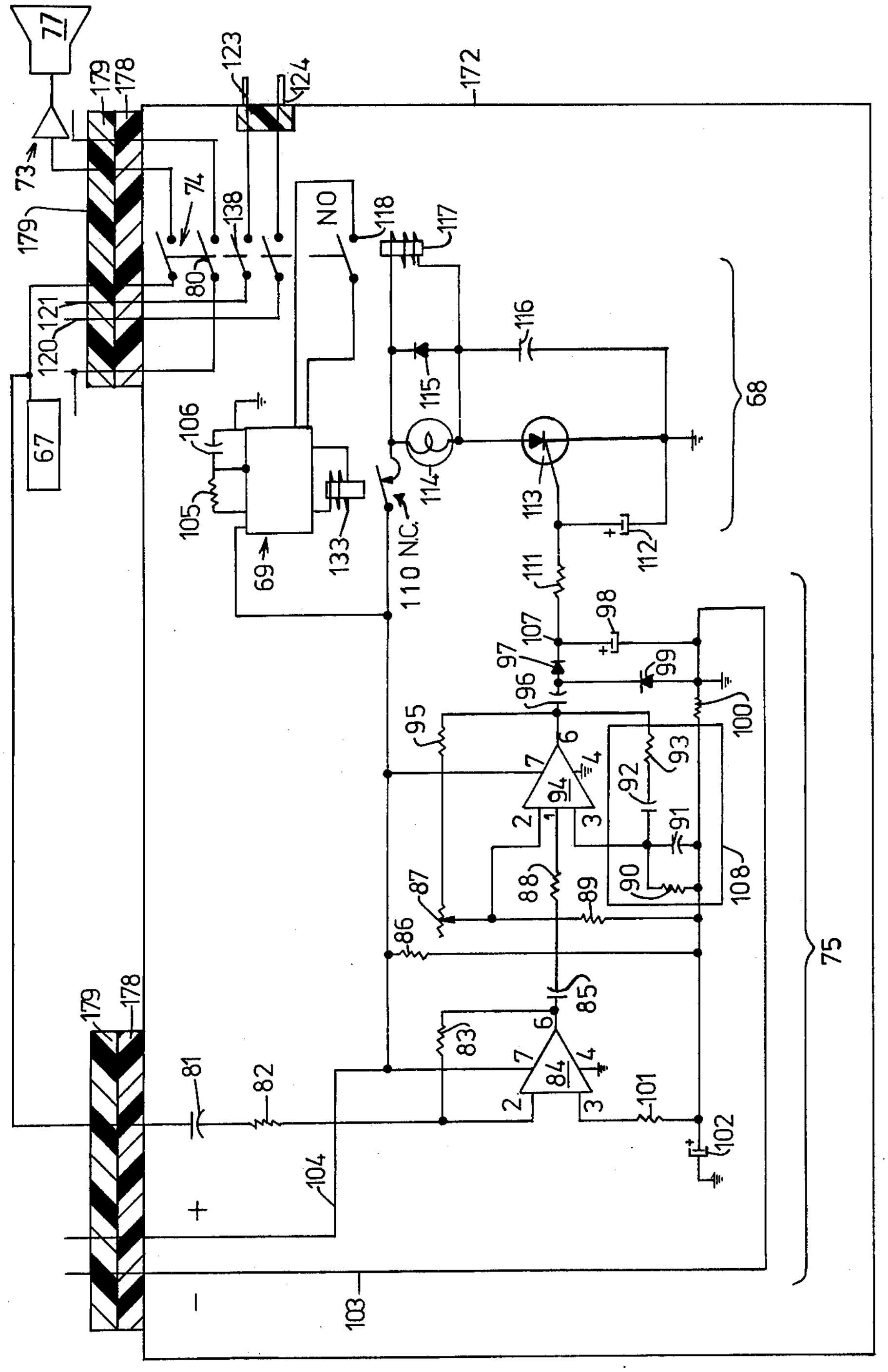
FIG. 9 is a schematic wiring diagram of a signal sensitive circuit 75 and related latching and time delay assemblies of assembly 64 in a housing 172.

Assemblies 67, 75, 72, 70, 71, 73 are housed in casings 171 and 172 and are, according to an embodiment of this invention operatively connected as in FIGS. 8 and 9.

The audio frequency wave carried by the radio wave of given frequency and bandwidth sent out by the transmitter 31 is selectively received by radio frequency receiver assembly 70 and audio detector assembly 71 by the tuning of the assembly 70.

The detector portion 71 of the assembly 67 is connected to loudspeaker assembly 73 through switch 74, which is normally open (FIG. 8). A wiring diagram of the trigger audio signal detector assembly 75 is diagrammatically shown in FIG. 9. The gain of assembly 70 is adjusted at resistor 76 so that the output level at the loudspeaker 77 is adequate when the trigger signal detector assembly 75 is activated and closes switch 74: this accomodates the sensitivity of the circuit to operation in low levels of ratio frequency energy as in the zones 41–44 and 46 and zones as U distant from the source of radio signals therefor, as from transmitter 31.

Tuning of the frequency of the circuit portion 70 is accomplished by adjustment of capacitators 78 and 79. The variable capacitator tuning shown in the circuit may be replaced by crystals to provide crystal tuning because each circuit as 70 of each assembly as 67 of each assembly as 64 in each zone as 21 is to be adjusted for receipt of radio frequency signal only from one transmitter as 31 providing audio trigger signal to such receiver, as 64, as is the usual case.

The switch 75 is controlled by the time delay circuit 69 and latching circuit 68 which are, in turn, activated and controlled by the audio signal detector assembly 75. Signal detector assembly 75 is a tone decoder and a wiring diagram thereof is set out of FIG. 9 and the value of the parts thereof are set out in Table II. Signal detector assembly 75 uses an operational amplifier and it operates at a frequency below 3 KHz which is below the frequency at which the gain of such type amplifier falls off. The gain is set by radio of resistance 83 to resistance 82; resistor 101 has value of $(R_{83} \times R_{82}) \div (R_{82} + R_{83})$.

The desired gain and impedance of operational amplifier 84 are set by standard table therefor. Capacitators 91 and 92 and resistors 90 and 93 determine the frequency to which response is made by the circuit 75. Gain is varied at resistor 87; bandwidth is set at resistor 88. Value of capacitators 96 and 98 provide the time delay to provide desired time delay in rise of the output voltage at junction 107; this allows the circuit to respond only to tone signals of a predetermined length or duration and so avoids triggering switch 74 on voice signals or noise. The assembly 75 is built on a 2 × 2½ inch [5 cm × 6.5 cm] circuit board.

The value of capacitators 91 and 92 and resistors 90 and 93 in the audio signal trigger circuit 75 are the same for a given frequency as for values of capacitators 191 and 192 and resistors 190 and 193 above described for the audio signal broadcast frequency determinants by formula $F = 0.159/RxC$ where $F$ is frequency in c.p.s. (or Hz) and where $R$ is resistance of resistor 93 in megohms, and $C$ is capacitance of capacitator 92 in microfarads. Bandwidth is 1 to 3 percent when resistance 101 is 2.2 megaohms; accordingly well over 40 signals may be provided in a range of 20 to 3,000 Hz without interference.

The timer circuit 69 allows a timing range of several seconds to several minutes and is usually set for two minutes for each repetition of the alerting message. The time delay circuit 69 used in FIG. 9 and time delay unit 161 of FIG. 5 would be the same. A detailed wiring diagram of the timing circuit is in FIG. 16 and list of parts therefor is in Table III.

The connection between amplifier and detector is bridged by an adjustable manual control switch 66 and a relay controlled switch 80. Thereby the resident in an area as Q may use the radio unit for pleasure listening purposes as well as notified of dangerous local conditions when silence is desired except for notice of local dangerous conditions. The relay switch 80 is a volume control shorting switch so that notice of alarm conditions will not be weakened by use of the radio unit 64 at reduced volume. Thereby the tone signal that activates circuit 73 will place the loudspeaker 77 at maximum volume.

Each of the receiving assemblies as 63, 64, and 65 in each of areas 21–29 comprise a pair of adjacent and connected rigid electrically insulating casings or housings 171 and 172, parts of which are shown for receiver assembly 64 in FIGS. 10–13. One base housing, 171, firmly supports the radio frequency receiver 70, audio frequency detector 71, and audio amplifier and loudspeaker assembly 73 of modified receiver assembly 67; the second, supported housing or casing 172 contains and firmly supports and is attached to the audio signal receiver assembly 75 and the latch and time delay assemblies 68 and 69. The base housing 171 is firmly attached to and supports a connector plate 178 and the supports housing 172 is firmly attached to and supports a mating connector plate 179 to provide firm electrical connection between the conductors passing between assemblies 67, 70 and 71 and assemblies 68, 69 and 75, as shown diagrammatically in FIGS. 8 and 9 and 10.

The frequency determining elements 90–93 for each audio signal detecting assembly as 75 in casing 172 are mounted in rigid plates as 108 that are provided with connector pins that operably electrically connect to the remainder of circuit 75 so that the frequency of the audio tone (in the 20 to 3000 Hz range) to which the overall assembly as 64 responds by closure of switch 74, is the same as the frequency for the area Q of zone 21 set at panel 50 whereby such assembly (75) is adapted for use in one geographic area as Q of zone 21 in which such apparatus as 64 is to be located. Other connector plates like 108 but with other values of components determinative of the audio frequency response are provided in other like assemblies, as 65, to correspond to the audio frequencies of panel 50 for the corresponding area, as R.

Figure 10:
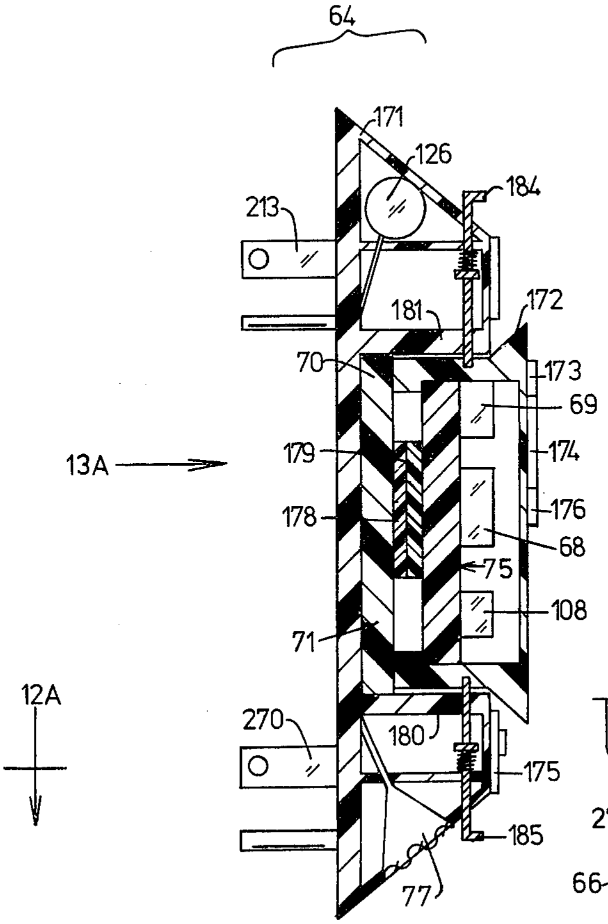
FIG. 10 is a vertical sectional view through vertical plane 10A—10A of FIG. 11.

The base housing 171 surrounds and protects the assemblies as 67, 70, 71, and 73 therein and also has rigid support and alignment arms as 180 and 181 firmly attached thereto that firmly support and locate the supported housing 172 therein as shown in FIG. 10.

Spring loaded releasable mechanical latch means 184, and 185 are provided for firm yet releasable holding of the assembly 172 to assembly 171. Casing 171 carries indicia of the larger area (21) in which located, while casing 172 carries indicia of the smaller area as Q in which to be used. A test switch 128 supported on the outside of the panel forming front of casing 172 connects amplifier and loudspeaker assembly 73 to circuit 67 and, with assembly 64 connected to a source of a.c. power 119 and transmitter 31 operating, provides listener with assurance of operability of the system by hearing broadcast of that transmitter at loudspeaker 77 and permits use of assembly 64 for listening pleasure. A battery check light switch 125 checks the condition of battery 126 by test light 127 when the power to assembly 64 is disconnected from a.c. power source.

Figure 11:
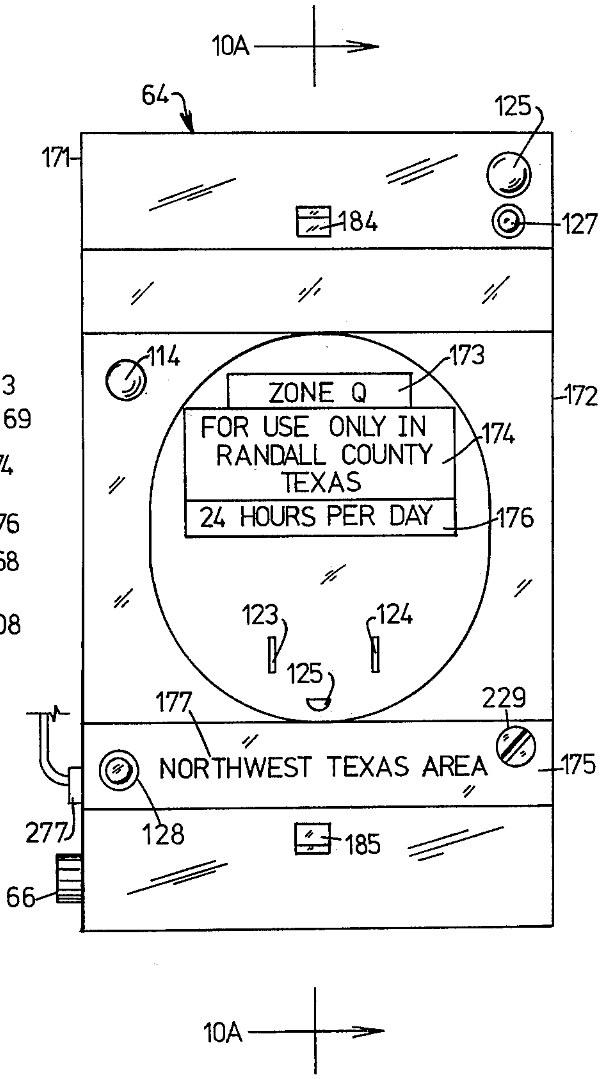
FIG. 11 is a front view of a receiving assembly 64.

Each supported casing as 172 has firmly affixed thereto or imprinted thereon an identification of the zone, e.g., "Q" as shown in FIG. 11, corresponding to the audio signal at panel 50 for the area in which the receiver 64 is to be used. Also, an identification 176 on plate 174 of the geographic zone in which that receiver (64) is to be used by its publicly known or otherwise recognized name, such as the county or counties in which it is to be used—or a school district name, if smaller areas are used—or an area defined in a code book. Such identification of the area of use of the supported casing and signal responsive circuits therein requires a substantially permanent attachment of the supposed casing as 172 and circuits therein to the base housing, as 171, which contains circuits tuned to the radio frequency—as from station 31—carrying the audio signal frequency for that zone (Q in FIG. 2) where the effective broadcast zone of the transmitter is constant 24 hours per day.

For each of the several large areas as 21–29 served by a radio frequency transmitter as 31–39 respectively, a sufficiently different frequency of radio wave is used so that reception of the intended radio frequency in one area as 21 are not interfered with by waves broadcast from transmitters, as 32–36 in adjacent areas as 22–26 even in the zones of overlap as 40–49.

The tuning capacitators as 78 and 79 (or corresponding crystal circuits) are tuned to the frequency of the transmitter as 31 which transmits the audio signal for the area (as 21) in which the receiver assembly as 64 in located.

Accordingly, signals to the specific areas A–Z are actuated by actuating the ON switches of the array 54 corresponding to the location of such areas.

The areas A–Z thus divide the broadcast areas as 21 into arbitrary but clearly defined geographical zones for purpose of sufficient specific location of instruments as 63–65 in the desired zones (as any of the counties A–Z indicated in FIG. 3) dependent upon circumstances at such location.

Each circuit as 75 receptive to assigned tone, as 100 Hz, has provided therewith time delay elements as 96 and 98 that require that such tone be on for a predetermined length of time to avoid that spurious or accidental emanations of such tones accidentally activate the signal; and each receiver as 64 has a time delay 69 which turns the loudspeaker device off only after a predetermined operating time thereof.

Control panel as shown in FIGS. 4 and 5 has switch 168 that automatically plays the preselected tone for a preselected time that correspond to the length of the period for which the time delay relay on the signal receiver holds the signal receiver switch 74 off to avoid spurious signals.

The sequence for time delay 69 is as follows: after the trigger signal operates on circuit 75 for 30 seconds, it (circuit 75) turns on the latching relay 117; the latching relay then closes the normally opon switches 74 (to audio assembly 73) and 118 (to time relay 69); the latching relay thereby starts operation of the time delay. The time delay keeps the switch 74 closed for a fixed period of time while the transmitter 31 delivers the message from broadcaster 59 then disconnects the latch power switch 110; when that switch 110 moves to an open position it disconnects the signal to time delay via switch 118 and so returns the time delay to its normally quiescent state. Switches 74 and 118 are tied to move together with power switch 138.

After the switch arm 118 is closed, the time delay is powered by normally closed switch 110. After time has expired, the time delay opens the arm of the relay 110 and releases the relay 117. The release of the relay 117 opens the normally open switch 118 and deactivates the time delay again.

The housing 171 has an upper pair of rectangularly sectioned projecting plug arms 212 and 213 and a lower pair of rectangularly sectioned plug arms 270 and 271 each of such upper arms being 3/64 inch wide and ¼ inch high and 11/16 inch long and spaced apart ½ inch horizontally with the lower arms similarly sized and spaced and the lower arms 1½ inches below the upper arm whereby the arms fit into the standard electrical double wall plug. The upper arms 212 and 213 connect at their exterior ends to the terminals of standard 110–120 volt A.C. sockets, and, at their interior to a step down transformer coil 129 of rectifier 122 which provides power to the circuits of assemblies 67–73 and 75.

Upper and lower centrally located cylindrical ground plugs 278 and 279 attach firmly to casing 171 and connect to the conventional ground connection of such electrical wall plugs.

Figure 12:
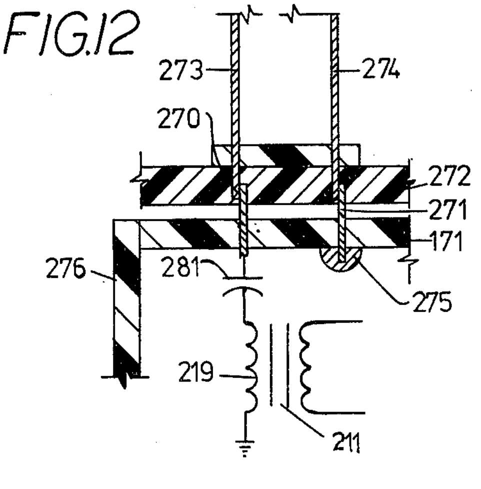
FIG. 12 is an enlarged diagrammatic transverse sectional view along section 12A of FIG. 10 to illustrate structures connected to the plug arms 270 and 271.
Figure 13:
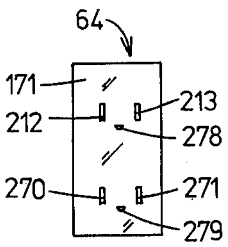
FIG. 13 is a reduced diagrammatic rear view, along direction of arrow 13A of FIG. 10 of the apparatus 64.

In the embodiment shown in FIG. 12, where the housing wiring is used as an antenna, one, lower, plug arm 270 is connected externally of housing 172 to one electrical line 273 of the pair of 110 volt power lines 273 and 274 and is connected interiorly of the housing 171 to a capacitator 281 and the capacitator is connected to a coil 219 that forms a part of the input antenna coil. Plug arm 270 thus serves as an antenna connector. Plug arm 271 is connected exteriorly of housing 172 to one a.c. power line 274 but that plug arm is connected interiorly of casing 172 to an insulating cap 275 whereby the plug 270 acts as an antenna connector as well as a support for the assembly 64. The plugs 212, 213, 270, 271, 278 and 279 fit firmly yet releasably into a wall socket and serve to support the assembly 64 as well as provide connections to an electrical power source, ground and an antenna. In other embodiment of apparatus shown in FIG. 8 the lower plugs are both connected interiorly to insulating caps as 286 and the antenna coil 219 is connected to an antenna plug 277 in the wall 276 of the casing 171 for connection to an antenna 210.

The panel assembly 50 can turn on any of the radio sets as 64 and 65 in a particular zone as 21 with the flip of a switch and could turn on all zones, one zone or any combination desired. Since the radios as 67 will respond only to one stations signal a transmitter as 32 in a neighboring region 22 may use the same code of audible tones broadcast at a different radio frequency yet transmitters of zones 21–27 never turn each others set on; thus it becomes feasible to also be able to turn on every set in the station simply by broadcasting all signal tones due to national emergency. All radio sets would respond automatically because the monitoring stations would be broadcasting on their individual frequencies.

Thus 27 different tones are all that would usually be needed to operate this system effectively anywhere in the world. The control panel or 50 should have 27 switches that would automatically play the on tone when switched in one direction. The tone would broadcast only long enough to let the decoder "trigger" then would become mute.

The system uses AM or FM receivers and the tone decoder-switch and the timer and latch circuits. The receiver is kept on all the time through the demodulation stage. The audio amplifier is held in off position by the switch 74. When the first prescribed selective control tone occurs for a prescribed time switch 74 turns on the audio amplifier and radio receiver function as a normal radio for times determined by the timer circuit 69. Tones other than the prescribed selective control tone will not affect the decoder switch. The signal tones are required to be on for a long enough time to so reliably activate the switch as to be free of transient effects.

Where in the overall system 20 a radio signal from one transmitter station, as station 31, does not reach a smaller geographically defined area, as area A within zone 21 as shown in FIG. 2, at night because of reduction in power and/or change in pattern shape of transmitter 31 broadcast and although such area (A in zone 21 of FIG. 2) is included within the effective coverage at the radio frequency characteristic (AM or FM) of the transmitter 31 during the day time hours, for nighttime scheduling of the activation of apparatuses as 63–64 to automatically connect a normally disconnected audio portion as 73 of a radio receiver as 64 as above described in that area (A in zone 21 of FIG. 2) for each of the receivers as 64 in that area (A in zone 21 of FIG. 2) a different combination of tuning characteristics than day-time tuning is used in the combination of radio frequency receiver, as 67 and audio output as 73, in a casing as 171 above described, and the audio signal receiver and latch and time delay assembly as 72 in a casing as 172 in such apparatus in such zone (as A in zone 21 of FIG. 2), therefore at night the r.f. receiver portion is tuned to a station as 29 that does cover an area, (a portion of outline of coverage of which is shown as 29 in FIG. 1 which includes that area (A of zone 21 in FIG. 2) at night and uses tuning of the audio signal detector circuit as 75 to corresponds to the audio signal frequency used at transmitter 39 for an area inclusive of or the same size as area A, as area D of zone 21 of FIG. 1, which area (D) is geographically the same as area A in zone 21 of FIG. 2 and which area (D in zone 21 of FIG. 1) is within the larger area or zone 29 covered by the transmitter 39 at night (rather than at night having such radio frequency receiver assembly 67 tuned to transmitter 31 and the radio signal detector as 75 tuned to tone "A" of the audio tone signal array 51 at transmitter 31).

The apparatus 64, like 63 and 65 and others in the system 20, includes a power switch 138 that is also actuated by the latch relay 117 to pass 110 volt a.c. power from the source 119 to the terminals 123 and 124 on the casing 172 when the audio signal to which the circuit 75 is tuned is received thereby (by circuit 67 and passed to 75 by line 62); such 110-volt a.c. power may at terminals 123 and 124 connect to and turn on lamps or a television set or other appliance as 58 in FIG. 3 to further alert persons in the vicinity of the receiver apparatus 64 of the emergency then described by the broadcaster 59 at the transmitter as 31 for that particular small defined geographic zone, as Q, in which such apparatus, as 64 is located.

The apparatus 64 provides that, while it is kept continuously on, the volume is kept low (at volume adjustment resistor 66) to avoid disturbing the listener 57 while at work or asleep, yet the full volume of loudness available from apparatus 64 should awaken a listener, as 57, when the audio trigger signal is applied to switch 74 in the area in which a message is intended to be delivered to such listeners by apparatus as 64 (e.g. area Q of zone 21). The action by apparatus as 64 of turning on a television set or other applicance (58) should awaken a listener as 57 at night in the event that the maximum volume of the loudspeaker 77 does not.

Battery 126 of the apparatus 64 powers assemblies 67–75 in the event that the alternating current power fails and/or the receiver apparatus as 64 is desired to be used as a portable unit (with, of course, an antenna as 120 operatively attached thereto).

TABLE I

INSERT A:
PARTS LIST FOR ENCODER CIRCUIT 154: (FIG. 5)

| Item | Description |
|---|---|
| 194 | IC, 741 |
| 199 | Capacitor, 47 µf, 16 volts, electrolytic |
| 192, 191 | Capacitor, values selected from Table VI and text |
| 197 | Capacitor, 0.01 µf for 2 kHz and up; 0.1 µf for 200 Hz to 2000 Hz<br>1 µf for 20 Hz to 200 Hz<br>10 µf for 2 Hz and below, |
| 196 | Transistor, npn, type 2N2924 or equivalent |
| 396, 397 | Resistor, 1K, ½ watt, 10% |
| 190, 193 | Resistor, values selected from Table VI and text |
| 189 | Resistor, 1K, ½ watt, 1% |
| 195 | Resistor, 2.05K, ½ watt 1% |
| 198 | Resistor, 3.3K, ½ watt, 10% |
| 200 | Resistor, value selected to match impedance of driven circuit (tone output at 201) |

TABLE II

INSERT B:
PARTS LIST FOR SIGNAL RECEIVING CIRCUIT 75 AND LATCHING RELAY CIRCUIT 68: (FIG. 9)

Figure 14:
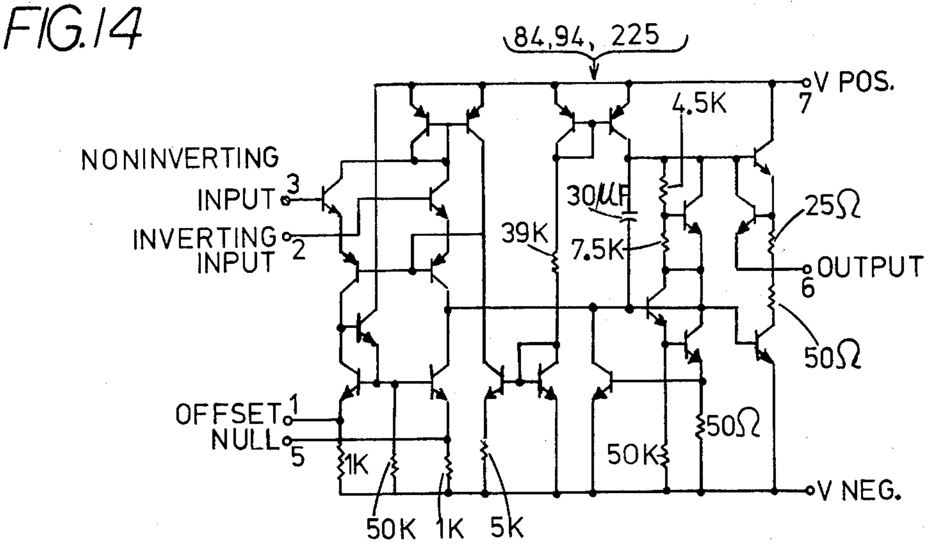
FIG. 14 is a schematic wiring diagram of the integrated circuit (I.C. 741) of FIGS. 8, and 9.

| Item | Description |
|---|---|
| 84, 94 | IC, type 741 (diagram in FIG. 14) |
| 81, 85 | Capacitator, 0.1 µf, 50 volts, disc |
| 91, 92 | Capacitator, select values from Table VI and the text |
| 96 | Capacitor, 0.1 µf, 50 volts for frequencies above 500 hertz; 1 µf for frequencies 50 to 500 hertz |
| 112 | Capacitator, 1 µf for fast response, 10 µf to 100 µf for slow response |
| 102 | Capacitor, 47 µf, 16 volts, electrolytic |
| 97, 99 | Diode, silicon, type 1N914 or equivalent |
| 82, 83, 101 | Resistors, select value from Table V and text |
| 88 | Resistor, see text (2.2 megohms) |
| 89 | Resistor, 1K, ½ watt 1% |
| 87 | Potentiometer, 500 ohms, 10%, miniature for printed circuit board |
| 95 | Resistor, 1.8K, ½ watt, 1% |
| 93, 90 | Resistors, select value from Table VI and text |
| 86, 100 | Resistors, 1K, ½ watt, 10% |
| 112 | Capacitor,. 10 µf, 6 volts electrolytic |
| 116 | Capacitor, 0.1 µf, 50 volt |
| 113 | SCR, 800 ma, type C103YY or equivalent |
| 114 | Lamp, 12 volts |
| 111 | Resistor, 3.3K |
| 110 | Switch, normally closed |
| 115 | Diode, 1 ampere, type 1N4002 or equivalent |
| 117 | Relay, 12 volts, 100 to 1000 ohms |

TABLE III

INSERT C:
TIMER PARTS (FIG. 16) ASSEMBLY 69

| Item | Description |
|---|---|
| 131, 132 | 27 K resistor |
| 133 | load |
| 134 | 0.1 microfarad capacitator |
| 135 | N.E. 555 (Signetics) |

TABLE III-continued

INSERT C:

| Item | TIMER PARTS (FIG. 16) ASSEMBLY 69 Description |
|---|---|
| | (555 I.C.) details in FIG. 17, a functional diagram |
| 139 | 0.01 microfarad condenser |
| 105 | time delay resistor |
| 106 | time delay capacitator |

TABLE IV

Figure 15:
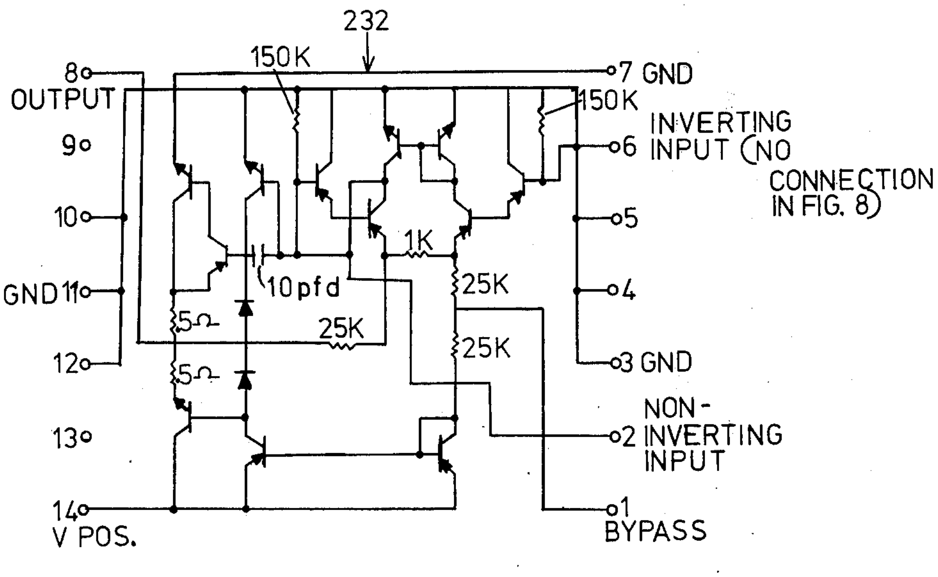
FIG. 15 is a schematic wiring diagram of the integrated circuit LM 380 I.C. used in FIG. 9.

INSERT D:

| Item | BROADCAST RECEIVER CIRCUIT (FIG. 8) Description |
|---|---|
| 225 | IC, type 741 or equivalent (FIG. 14) |
| 232 | IC, type LM 380 or equivalent (FIG. 15) |
| 126 | Battery, 12 volts total |
| 78, 79 | Capacitor, 365 μF, variable |
| 217, 231 | Capacitor, 0.01 μF, 50 volts mylar |
| 221, 230 | Capacitor 0.1 μF, 50 volts, disc |
| 223 | Capacitor 22 μF, 25 volts electrolytic |
| 216 | Catwhisker and crystal, Philmore (or 1 N34A diode) |
| 211, 215 | Loopstick, 5¼ inches secondary 10 turns |
| 66 | Potentiometer, 10K |
| 222, 224 | Resistor, 10K, ½ watt |
| 226 | Resistor, 1 megohm, ½ watt |
| 220, 227 | Resistor, 1K, ½ watt |
| 218 | Transformer, primary 10K, secondary 2K, miniature audio |
| 120, 121 | 110 volt a.c. power line |
| 111 | Step down transformer 110 v. – 12 v. |
| 105 | Rectifier |
| 104 | + 12 volt line |
| 103 | negative line |
| 228, 233 | Capacitator, 220 μF, 25 volt electrolytic |
| 214 | Two six-inch sections of plastic covered No. 22 wire twisted together to form a gimmick coupling capacitator; the gimmick can be cut to length that gives best overall operation. |

TABLE V

INSERT E:

VALUE FOR R-82, 83, 101 TO OBTAIN DESIRED GAIN WITH GIVEN INPUT IMPEDANCE (CIRCUIT OF FIG. 9)

| Input Impedance (kilohm) | Gain | 82 (101) (kilohm) | 83 (kilohm) |
|---|---|---|---|
| 10 | 200 | 10 | 0.002 |
| 10 | 100 | 10 | 0.001 |
| 10 | 50 | 10 | 500 |
| 10 | 25 | 10 | 250 |
| 10 | 10 | 10 | 100 |
| 10 | 1 | 10 | 10 |
| 1 | 200 | 1 | 200 |
| 1 | 100 | 1 | 100 |
| 1 | 50 | 1 | 50 |
| 1 | 25 | 1 | 25 |
| 1 | 10 | 1 | 10 |
| 1 | 1 | 1 | 1 |
| 100 | 50 | 100 | 0.005 |
| 50 | 100 | 50 | 0.005 |
| 25 | 100 | 25 | 0.0025 |

TABLE VI

INSERT F:

FREQUENCY AND CAPACITY VALUES FOR ENCODER (FIG. 5) AND DECODER (FIG. 9)

| Frequency (Hz) | Capacitators 91, 92, 191, 192 (μF) | Resistors 90, 93, 190, 193 (megohm) |
|---|---|---|
| 1 | 1 | 0.159 |
| 10 | 1 | 0.0159 |
| 25 | 1 | 0.00636 |
| 50 | 0.1 | 0.0318 |
| 100 | 0.1 | 0.0159 |

TABLE VI-continued

INSERT F:

FREQUENCY AND CAPACITY VALUES FOR ENCODER (FIG. 5) AND DECODER (FIG. 9)

| Frequency (Hz) | Capacitators 91, 92, 191, 192 (μF) | Resistors 90, 93, 190, 193 (megohm) |
|---|---|---|
| 200 | 0.1 | 0.008 |
| 300 | 0.047 | 0.0113 |
| 400 | 0.047 | 0.0085 |
| 500 | 0.047 | 0.0067 |
| 750 | 0.02 | 0.0106 |
| 1000 | 0.02 | 0.008 |
| 1250 | 0.02 | 0.00636 |
| 1500 | 0.01 | 0.106 |
| 1750 | 0.01 | 0.009 |
| 2000 | 0.01 | 0.008 |
| 2500 | 0.01 | 0.0064 |
| 3000 | 0.01 | 0.0053 |
| 5000 | 0.005 | 0.0063 |
| 10,000 | 0.002 | 0.008 |

We claim:

1. A localized area warning system comprising, in a large geographically defined area, a radio frequency transmitter provided with (a) means for producing a plurality of modulating signals each of fixed frequency in range of 20 to 3,000 Hz, and (b) means for producing a fixed radio frequency output, and, in each of several separate smaller geographically defined area portions within said one large area, a plurality of radio frequency receiving circuits each comprising an audio frequency detector assembly with an electrical output and a power input operatively connected thereto, said output of said detector assembly connected to a loud speaker through a normally open first switch operatively connected to a first switch closing means therefor, said first switch closing means connected to means providing an input signal to a time delay means, said time delay means having an output operatively connected to a circuit controlling said first switch closing means whereby to close said first switch at the end of a predetermined time period, an audio frequency signal receiving circuit operatively connected to the output of said audio frequency detector assembly and selectively actuated only by one audio frequency signal characteristic of one smaller geographical area portion; an electrical power source operatively connected to said audio frequency receiving circuit, a second time delay circuit having an input operatively connected to and actuated by said audio frequency signal receiving circuit and having an output operatively connected to a second switch closing means between a power source for said first switch closing means and said first switch closing means whereby to provide a predetermined time of connection of said loudspeaker to said audio frequency detector assembly on receipt by said audio frequency receiving circuit and said audio frequency detector assembly of said one audio frequency signal for a predetermined time period, and a volume control means connected between said ratio frequency receiving circuit and said loudspeaker, a third normally open switch controlled by a relay therefor and said third switch bridging said volume control means when closed, said relay operatively connected to and maintained in operative connection to a power source by said first time delay means and said relay when actuated closing said third switch, and wherein each of said audio frequency signal receiving circuits is located in a casing that carries identification of said separate smaller geographically defined area in which to be used.

2. A system as in claim 1 wherein said large area is one of several large areas and, in each of those several large areas the means for producing fixed ratio frequency output comprises an assembly producing a different radio frequency output in each of said several large areas.

3. A system as in claim 1 wherein each of said radio frequency receiving circuits is located in a second casing and an identification of said large geographically defined area is affixed to said second casing.

4. A radio frequency receiver circuit comprising an audio frequency detector assembly with an electrical output and a power source operatively connected thereto, said output of said detector assembly connected to a loudspeaker through a normally open first switch operatively connected to a first switch closing means therefor, said first switch closing means connected to means providing an input signal to a time delay means, said time delay means having an output operatively connected to a circuit controlling said first switch closing means whereby to close first said switch at the end of a predetermined time period, an audio frequency signal receiving circuit operatively connected to an output of said audio frequency detector assembly and selectively actuated one by one audio frequency signal, an electrical power source operatively connected to said audio frequency receiving circuit, a second time delay circuit having an input operatively connected to and actuated by said audio frequency signal receiving circuit and having an output operatively connected to a second switch closing means between (a) a power source passing to said first switch closing means and (b) said first switch closing means, whereby to provide a predetermined time of connection of said loudspeaker to said audio frequency detector assembly on receipt by said ratio frequency receiver and said audio frequency detector assembly of said one audio frequency signal for a predetermined time period, and a volume control means connected between said ratio frequency receiver circuit and said loudspeaker, a third normally open switch controlled by a relay therefor and said third switch bridging said volume control means when closed, said relay operatively connected to and maintained in operative connection to a power source by said first time delay means, and said relay when actuated closing said third switch, and wherein each of said audio frequency signal circuits is located in a casing that carries indicia of a geographically defined area in which to be used.

5. Apparatus as in claim 4 wherein said radio frequency receiver circuit is located in a second casing and an indicia of the identification of a larger geographically defined area is affixed to said second casing.

6. Apparatus as in claim 5 wherein said radio frequency receiver circuit comprises an amplitude modulation radio wave receiving circuit operatively connected to said audio frequency detector assembly.

7. Apparatus as in claim 5 wherein said radio frequency receiver circuit comprises a frequency modulation radio wave receiving circuit operatively connected to said audio frequency detector assembly.

8. A localized area warning process comprising, in a large geographic area, continuously operating a radio frequency transmitter at and broadcasting a fixed radio frequency signal characteristic with audio modulation and a plurality of distinct emergency modulating audio signals each of fixed frequency in range of 20 to 3,000 Hz, carried by said radio frequency signals for a predetermined time and, in one of several separate smaller geographic area portions within said one large area, at each of a plurality of radio frequency receiving circuits tuned to said fixed radio frequency signal and comprising a audio detector circuit and a loudspeaker circuit not operatively connected to said detector circuit, continuously actuating said audio detector circuit by said modulated frequency signals and an electrical power source and, in an emergency situation, selectively actuating a selective audio signal frequency receiving circuit by one of said distinct emergency modulating audio signals carried by said radio frequency signal and characteristic of that one smaller geographic area portion only, and timing said period of actuation and after a predetermined period of time of such actuation operatively connecting said audio detector to a loudspeaker and then maintaining operative connection therebetween for only a predetermined period of time while an audio frequency signal is passed from said radio frequency transmitter to said loudspeakers and an audible verbal message produced by said loudspeaker.

9. Process as in claim 8 comprising, in each of several separate smaller geographic area portions within said one large area, at each of a plurality of said radio frequency receiving circuits tuned to sid fixed radio frequency signal characteristic, continuously actuating said audio detector thereby and in an emergency, selectively actuating by said modulated frequency signals and an electrical power source a selective audio frequency signal receiving circuit by one of said distinct emergency modulating audio signals characteristic of each smaller geographic area portion only, and timing said period of actuation and after a predetermined period of time of such actuation operatively connecting said audio detector to a loudspeaker and then maintaining operative connection therebetween for only a predetermined period of time while in each of siad smaller geographic area portions an audio frequency signal is passed from said radio frequency transmitted to said loudspeakers and an audible verbal message is produced by each of said loudspeakers

10. Process as in claim 9 comprising, in each of several large geographically defined areas, operating a radio frequency transmitter and broadcasting at a fixed radio frequency signal characteristic different from the radio frequency signals in other of said several large areas, and with a plurality of distinct emergency modulating audio signals each of fixed frequency in range of 20 to 3,000 Hz, carried by said radio frequency signals and, in one of several separate smaller geographic area portions within each of said large areas, at each of a plurality of said radio frequency receiving circuits tuned to said fixed radio frequency signal characteristic of one large area continuously actuating the said audio detector by said modulated frequency signals and an electrical power source and, in an emergency situation, selectively actuating a selective andio frequency signal receiving circuit by one of said distinct emergency modulating audio signals characteristic of only that one smaller geographic area portion of said one large area, and timing said period of actuation and after a predetermined period of time of such actuation connecting said audio detector to a loudspeaker and then maintaining connection therebetween for only a predetermined period of time while an audio frequency signal is passed from said radio frequency transmitter to said loudspeakers and an audible verbal message is produced by each of said loudspeakers.

11. Process as in claim 10 wherein some of said radio frequency transmitters transmit radio waves at a fixed frequency.

12. Process as in claim 10 wherein some of said radio frequency transmitters transmit frequency modulated radio waves.

* * * * *